United States Patent
Perlman (10) Patent No.: US 6,813,643 B2
(45) Date of Patent: Nov. 2, 2004

(54) MULTIMEDIA SYSTEM WITH SELECTABLE PROTOCOL MODULE INCLUDING MPEG LOGIC AND DOCSIS LOGIC SHARING A SINGLE TUNER

(75) Inventor: Stephen G. Perlman, Palo Alto, CA (US)

(73) Assignee: Digeo, Inc., Kirkland, WA (US)

( * ) Notice: Subject to any disclaimer, the term of this patent is extended or adjusted under 35 U.S.C. 154(b) by 629 days.

(21) Appl. No.: 09/755,517

(22) Filed: Jan. 5, 2001

(65) Prior Publication Data

US 2002/0091866 A1 Jul. 11, 2002

(51) Int. Cl.[7] .............................................. G06F 15/16
(52) U.S. Cl. ....................... 709/232; 709/100; 709/104; 709/238; 709/241; 709/247; 370/351; 370/422; 370/431; 348/731; 348/732
(58) Field of Search ................................. 709/100, 104, 709/238, 241, 247, 232; 370/351, 422, 431; 348/731, 732

(56) References Cited

U.S. PATENT DOCUMENTS

| | | | |
|---|---|---|---|
| 5,230,019 A | 7/1993 | Yanagimichi et al. |
| 5,371,551 A | 12/1994 | Logan et al. |
| 5,444,491 A | 8/1995 | Lim |
| 5,495,246 A | 2/1996 | Nichols et al. |
| 5,515,373 A | 5/1996 | Lynch et al. |
| 5,627,539 A | 5/1997 | Lynch et al. |
| 5,631,651 A | 5/1997 | Nichols et al. |
| 5,634,074 A | 5/1997 | Devon et al. |
| 5,650,831 A | 7/1997 | Farwell |
| 5,721,727 A | 2/1998 | Ashi |
| 5,721,827 A | 2/1998 | Logan et al. |
| 5,727,233 A | 3/1998 | Lynch et al. |
| 5,732,216 A | 3/1998 | Logan et al. |

(List continued on next page.)

FOREIGN PATENT DOCUMENTS

| | | |
|---|---|---|
| EP | 0 346 700 A2 | 12/1989 |
| EP | 0 364229 A2 | 4/1990 |
| EP | 0 512 398 A2 | 11/1992 |
| EP | 0 666694 A1 | 8/1995 |
| EP | 0 676761 A1 | 10/1995 |
| EP | 0 714204 A2 | 5/1996 |
| EP | 0 756 393 A1 | 7/1996 |
| EP | 0 749244 A2 | 12/1996 |
| EP | 0 753964 A1 | 1/1997 |
| EP | 0 773681 A2 | 5/1997 |
| EP | 0 903738 A2 | 3/1999 |
| EP | 0 911 962 A1 | 4/1999 |
| EP | 0 971358 A2 | 1/2000 |
| EP | 1 018 835 A2 | 7/2000 |
| EP | 1 032 195 A2 | 8/2000 |
| EP | 1 056 279 A1 | 11/2000 |
| EP | 1 143722 A1 | 10/2001 |
| GB | 2 333 017 A | 10/1998 |
| WO | WO 99/22513 A2 | 5/1999 |
| WO | WO 00/01149 | 1/2000 |
| WO | WO 00/51129 A1 | 8/2000 |
| WO | WO 01/11865 A1 | 2/2001 |
| WO | WO 01/74079 A1 | 10/2001 |

OTHER PUBLICATIONS

Copy of the PCT Search Report dated Jul. 18, 2002. (4) pages.

Primary Examiner—Nabil El-Hady (57) ABSTRACT

A multimedia apparatus is described comprising: a tuner for tuning to a carrier frequency and down-converting a frequency-modulated multimedia signal to a baseband multimedia signal; a selectable protocol module including QAM/MPEG logic and Data Over Cable Service Interface Specification ("DOCSIS") logic configured to receive the baseband multimedia signal; and selection logic configured to select the QAM/MPEG logic for processing a first signal having a first signal format to produce a first processed signal, the selection logic further configured to select the DOCSIS logic for processing a second signal having a second signal format to produce a second processed signal.

18 Claims, 6 Drawing Sheets

U.S. PATENT DOCUMENTS

| | | |
|---|---|---|
| 5,799,190 A | 8/1998 | Lynch et al. |
| 5,819,298 A | 10/1998 | Wong et al. |
| 5,862,220 A | 1/1999 | Perlman |
| 5,892,536 A | 4/1999 | Logan et al. |
| 5,896,444 A | 4/1999 | Perlman et al. |
| 5,918,013 A | 6/1999 | Mighdoll et al. |
| 5,931,949 A | 8/1999 | Perlman et al. |
| 5,938,748 A | 8/1999 | Lynch et al. |
| 5,940,073 A | 8/1999 | Klosterman |
| 5,963,909 A | 10/1999 | Warren et al. |
| 5,978,381 A | 11/1999 | Perlman et al. |
| 5,983,273 A | 11/1999 | White et al. |
| 5,986,692 A | 11/1999 | Logan et al. |
| 6,005,938 A | 12/1999 | Banker et al. |
| 6,014,693 A | 1/2000 | Ito et al. |
| 6,014,694 A | 1/2000 | Aharoni et al. |
| 6,023,585 A | 2/2000 | Perlman et al. |
| 6,026,079 A | 2/2000 | Perlman |
| 6,044,396 A | 3/2000 | Adams |
| 6,049,694 A | 4/2000 | Kassatly |
| 6,072,872 A | 6/2000 | Chang et al. |
| 6,073,168 A | 6/2000 | Mighdoll et al. |
| 6,088,455 A | 7/2000 | Logan et al. |
| RE36,801 E | 8/2000 | Logan et al. |
| 6,118,498 A | 9/2000 | Reitmeir |
| 6,134,590 A | 10/2000 | Perlman |
| 6,141,693 A | 10/2000 | Perlman et al. |
| 6,169,879 B1 | 1/2001 | Perlman |
| 6,199,076 B1 | 3/2001 | Logan et al. |
| 6,199,114 B1 | 3/2001 | White et al. |
| 6,233,389 B1 | 5/2001 | Barton et al. |

MULTIMEDIA SYSTEM WITH SELECTABLE PROTOCOL MODULE INCLUDING MPEG LOGIC AND DOCSIS LOGIC SHARING A SINGLE TUNER

BACKGROUND

1. Field of the Invention

This invention relates generally to the field of multimedia systems. More particularly, the invention relates to a multimedia system capable of selecting between different network protocols for transmitting and receiving data and multimedia content.

2. Description of the Related Art

Figure 1A:
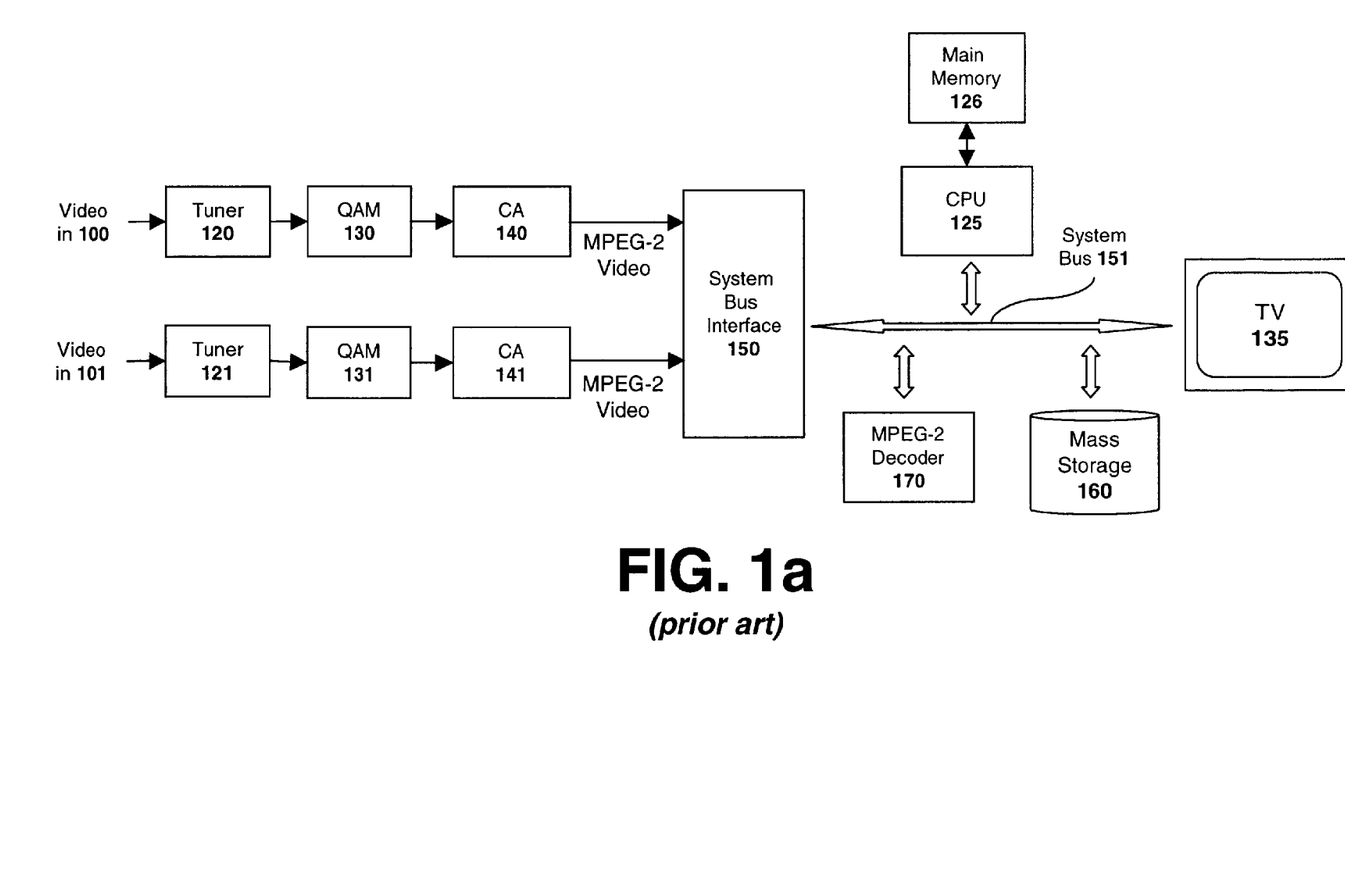
FIGS. 1a and 1b illustrate prior art multimedia receiver, storage and playback systems.

A prior art system for receiving a digital multimedia signal is illustrated in FIG. 1a. As illustrated, one or more tuners 120, 121 are configured to lock on to video signals 100, 101 transmitted at a carrier frequency and down-convert the signals to baseband. Quadrature Amplitude Modulation ("QAM") demodulators 130, 131 demodulate the baseband signals to extract the underlying digital data. As is known in the art, QAM is a modulation technique employed by cable and satellite providers that generates four bits out of one baud. For example, a 600 baud line (600 shifts in the signal per second) can effectively transmit 2,400 bps using this method. Both phase and amplitude are shaped with each baud, resulting in four possible patterns.

The demodulated signal is then transmitted to conditional access ("CA") subsystems 140, 141 which prevent channels/content from being transmitted on the system which the user does not have the right to receive (e.g., subscription-based content such as HBO or pay-per-view channels). CA subsystems 140, 141 are well known in the art and are currently manufactured by only a small group of companies including Scientific Atlanta,™ Motorola,™ General Instrument™ and DVB™.

If the CA subsystem 140, 141 allows the user to view a particular channel then multimedia content (i.e., audio and/or video content) from the channel is transmitted over a system bus 151 (via bus interface 150) to a mass storage device 160. An MPEG-2 decoder module 170 coupled to the system bus 151 decodes/decompresses the multimedia content before it is rendered on a multimedia rendering device 135 (e.g., a television).

Prior art systems may also utilize a main memory 126 for storing instructions and data and a central processing unit ("PU") 125 for executing the instructions and data. For example, the CPU may provide a graphical user interface displayed on the television, allowing the user to select certain television or audio programs for playback and/or storage on the mass storage device 120.

The system illustrated in FIG. 1a is capable of concurrently receiving, decoding and storing multimedia content from two independent broadcast channels (i.e., via tuners 120 and 121). One limitation of this system, however, is that it does not provide a return channel for two-way communication. As such, users are unable to transmit data back to the cable or satellite provider or otherwise interact with the multimedia content.

Figure 1B:
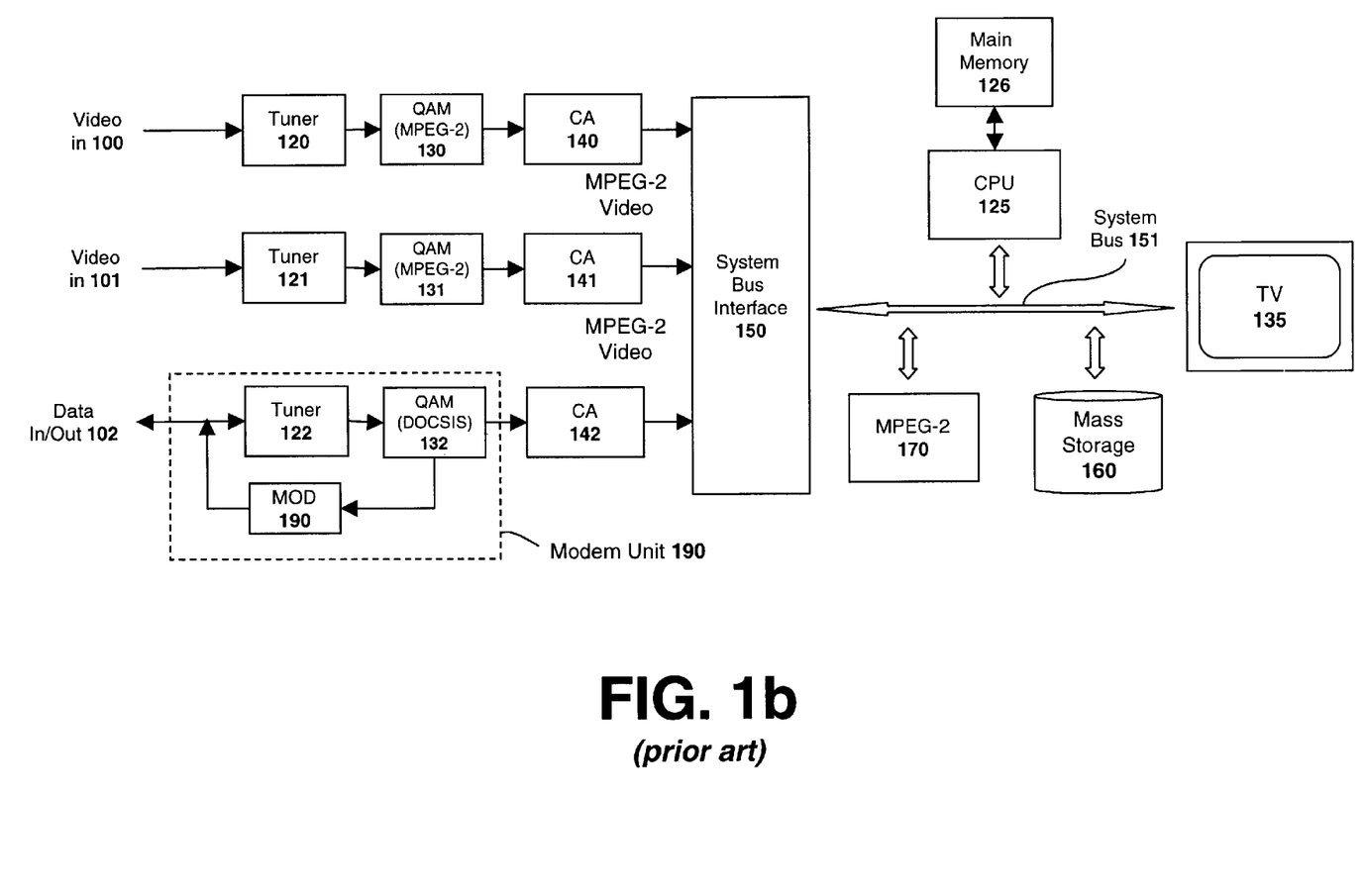

To address these limitations, the prior art system illustrated in FIG. 1b includes a separate modem unit 190 comprised of a tuner 122 for receiving data, a QAM module 132, and a transmitter/modulator unit 190 for transmitting data over a network (e.g., the Internet). As indicated in FIG. 1b, the QAM module 132 is configured to support the Data Over Cable Service Interface Specification ("DOCSIS"), a set of accepted standards for transferring packetized data over cable TV networks. Thus, using the system of FIG. 1b, a user is able to concurrently receive two cable broadcast channels while communicating over the Internet (e.g., sending email, browsing Web pages, downloading interactive content related to a particular TV program, . . . etc).

While the modem unit 190 provides the benefit of two-way communication, it also generates a significant additional cost as a result of the third system tuner 122, third QAM module 132, third CA subsystem 142 and the transmitter/modulator unit 190. Moreover, because the legacy systems shown in FIGS. 1a–b rely on proprietary technology (such as CA subsystems developed by third parties), cable providers are limited in their ability to modify the underlying protocols used to transmit multimedia content to the end user. As such, new transmission techniques/protocols which would allow cable providers to transmit content in a more flexible, efficient and intelligent manner may not be employed. For example, using a packet-switched protocol such as DOCSIS to transmit and receive multimedia content (as well as data), cable operators would be able to dynamically route content to end users more efficiently and would have the flexibility to implement their own security mechanisms (e.g., those used for secure communication over the Internet).

Accordingly, what is needed is a system and method for receiving and transmitting data and multimedia content over a cable network in a more flexible, efficient and intelligent manner. What is also needed is a system which is backwards-compatible with currently-existing network protocols and standards and which is less costly to manufacture than current systems, while providing at least the same level of functionality as current systems.

SUMMARY OF THE INVENTION

A multimedia apparatus is described comprising: a tuner for tuning to a carrier frequency and down-converting a frequency-modulated multimedia signal to a baseband multimedia signal; a selectable protocol module including QAM/MPEG logic and Data Over Cable Service Interface Specification ("DOCSIS") logic configured to receive the baseband multimedia signal; and selection logic configured to select the QAM/MPEG logic for processing a first signal having a first signal format to produce a first processed signal, the selection logic further configured to select the DOCSIS logic for processing a second signal having a second signal format to produce a second processed signal.

Also described is a multimedia communication system comprising: a communication channel configured to switch between a first mode in which the communication channel receives and decodes a first multimedia signal using MPEG logic, and a second mode in which the communication channel transmits and receives data and/or multimedia content according to the Data Over Cable Service Interface Specification ("DOCSIS") standard.

Also described is a method implemented by a multimedia service provider for transitioning to a Data Over Cable Service Interface Specification ("DOCSIS") communication standard comprising: providing subscribers with a first type of multimedia system having one or more selectable protocol modules, the selectable protocol modules being capable of selecting between a legacy communication standard and a DOCSIS communication standard for transmitting/receiving data and/or multimedia content; and switching from the legacy communication standard to a DOCSIS-only communication standard to transmit/receive multimedia content and/or data; and providing new subscribers with a second type of multimedia system having one or more DOCSIS modules capable of transmitting/receiving data and/or multimedia content according to the DOCSIS standard.

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of the present invention. It will be apparent, however, to one skilled in the art that the invention may be practiced without some of these specific details. In other instances, well-known structures and devices are shown in block diagram form to avoid obscuring the underlying principles of the invention.

Embodiments of a Selectable Mode Multimedia System

Figure 2A:
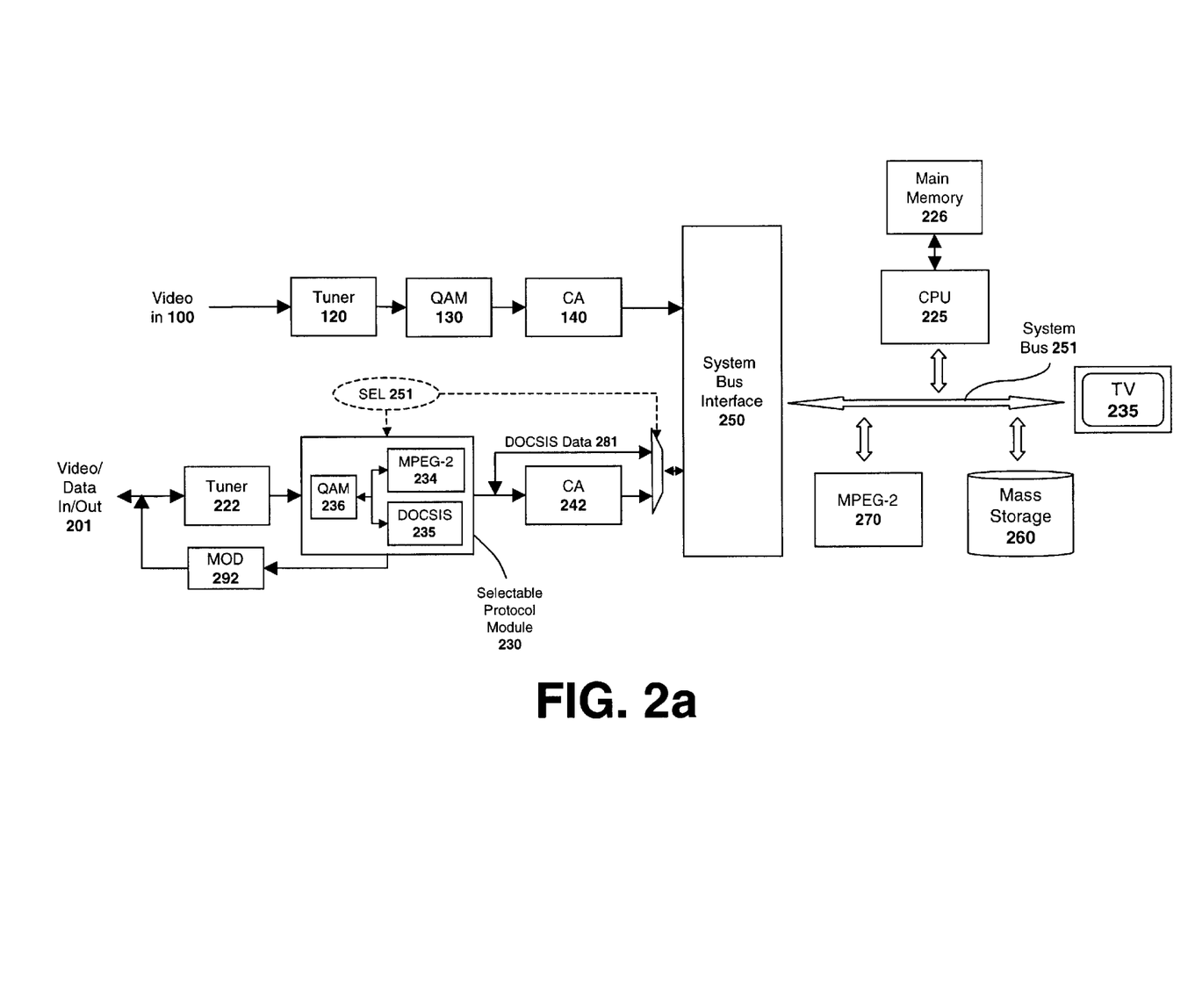
FIG. 2a illustrates a system for receiving and transmitting multimedia content and data according to one embodiment of the invention.

As shown in FIG. 2a, one embodiment of the invention is comprised of a first set of modules for tuning to and decoding a standard multimedia broadcast, including a tuner 120, a QAM module 130 and a CA module 140. Unlike prior art systems, however, the system illustrated in FIG. 2a shares the second tuner 222 and CA module 242 between a DOCSIS modem and a multimedia receiver/decoder channel. More specifically, the second set of components includes a selectable protocol module 230 which includes standard MPEG-2 logic 234 for processing multimedia cable/television channels and DOCSIS logic 235 for processing packetized data according to the DOCSIS standard. Both the MPEG-2 logic 234 and the DOCSIS logic 235 may share QAM demodulation logic 236 (the former for processing standard MPEG-2 video streams). It should be noted, however, that the DOCSIS logic 235 may employ various different modulation techniques while still complying with the underlying principles of the invention. In one embodiment, selection logic 251 selects between the MPEG-2 logic 234 and the DOCSIS logic 235 based on the actions of the user and/or the configuration of the multimedia system.

In operation, if a user is watching a first cable channel via tuner 120 and decides to concurrently record a second cable channel or watch the second channel on a separate display or picture-in-picture window, the second tuner 222 will lock on to the second channel responsive to the user's request and the selection logic 251 will select the MPEG-2 logic 234 and the QAM logic 236 for processing the incoming multimedia content from the second channel. The CA module 242 of this embodiment will then operate on the incoming multimedia content as described above (i.e., providing access to the channel/content only if the user has the right to view it). In one embodiment (not shown) the same CA module may be used to support both the first cable channel and the second cable channel (e.g., the CA module may be double-clocked to support the increased throughput).

By contrast, if the user chooses to browse Web pages on the Internet, send an email or perform any other data transactions while watching a cable channel via tuner 120, the selection logic 251 will select the DOCSIS module 235 for communicating DOCSIS-formatted data over the cable provider's network using the modulator unit 292 and the tuner 222 (for transmitting and receiving data, respectively). The DOCSIS module 235 may also employ the QAM logic 236, depending on how the incoming data is formatted by the service provider. In addition, because the CA module is not needed for receiving/transmitting DOCSIS-formatted data, the selection logic 251 may select the DOCSIS data bypass signal 281 to bypass the CA module 242 entirely.

Thus, unlike the system shown in FIG. 1b, the system illustrated in FIG. 2a shares a single tuner 222, a single CA module 242 and a single selectable protocol module 230 between a multimedia receiver channel (e.g., for receiving cable channels) and a DOCSIS channel, thereby reducing system cost while at the same time maintaining the same level of functionality as in prior systems.

Figure 2B:
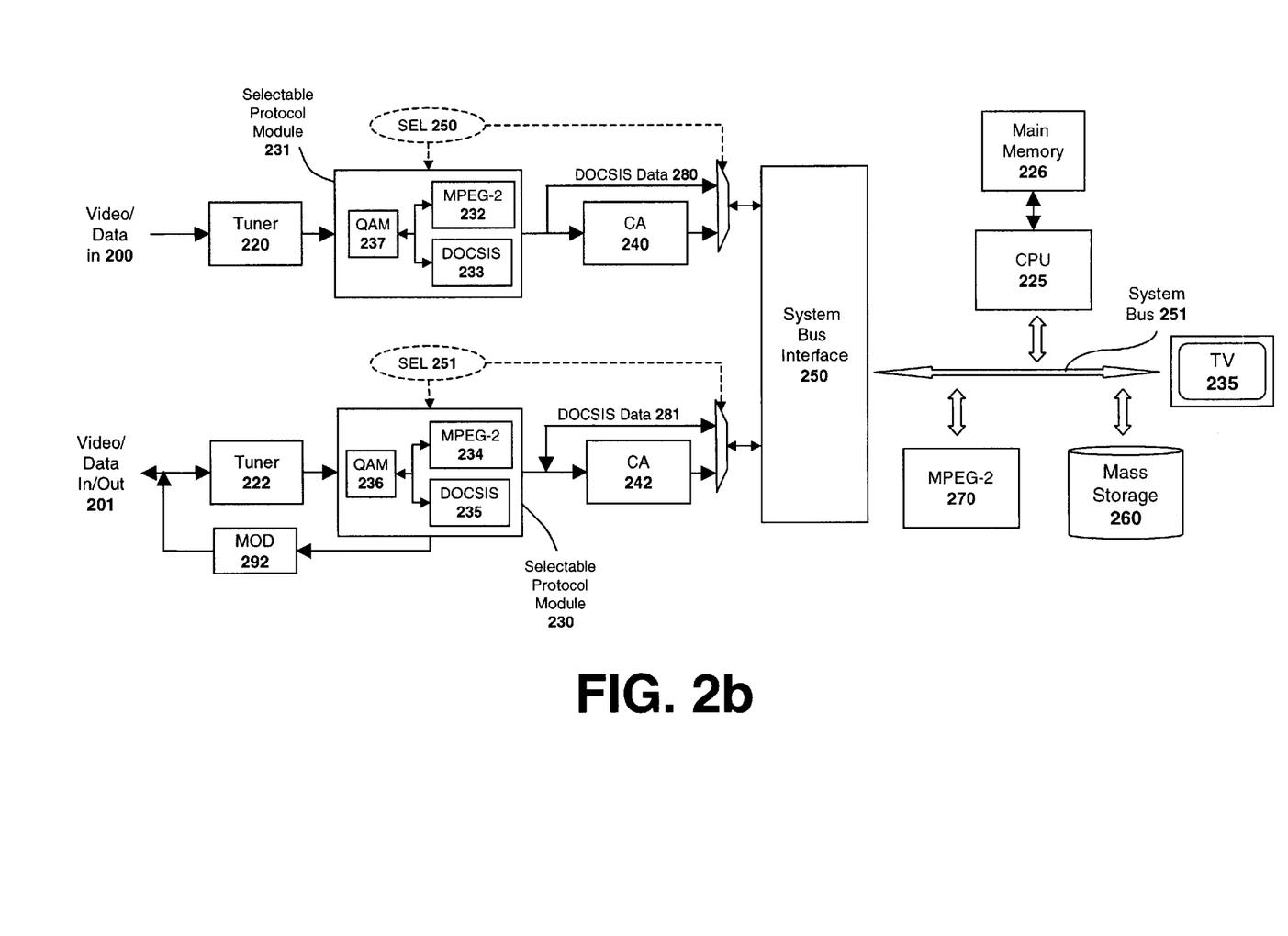
FIG. 2b illustrates a system for receiving and transmitting multimedia content and data according to another embodiment of the invention.

A related embodiment of the invention, illustrated in FIG. 2b, is comprised of a second selectable protocol module 231 which, responsive to selection logic 250, switches between MPEG-2 logic 232 for receiving multimedia content and DOCSIS logic 233 for processing packetized DOCSIS data/content. Because only one upstream communication channel is typically required, a second modulator/transmitter (such as modulator/transmitter 292) is not associated with the second selectable protocol module 231 (although such a configuration is nonetheless considered within the scope of the present invention). Thus, the embodiment illustrated in FIG. 2b provides two separate communication channels (one unidirectional channel and one two-way channel) which process content and data under the DOCSIS standard when selected by selection logic 250–251. As in the previous embodiment, when the DOCSIS logic 233, 235 is selected DOCSIS data bypass signals 280, 281 may be selected to bypass the CA modules 240, 242, respectively. Moreover, as with the embodiment illustrated in FIG. 2a, the DOCSIS logic 232, 235 may or may not use the QAM logic 237.

The selection logic 250, 251 described herein may be embodied in software executed by the CPU 225 and configured to select between MPEG-2 logic 232, 234 and DOCSIS logic 233, 235 based on the actions of the user. Alternatively, the selection logic 250, 251 may be embodied in any combination of hardware (e.g., an application-specific integrated circuit ("ASIC")), software and/or firmware while still complying with the underlying principles of the invention.

One benefit of the embodiments described above is that they provide cable operators and other multimedia content providers with the ability to transmit video (e.g., cable channels) using the DOCSIS standard without the need for a CA module for security. In order to provide security without a CA module, in one embodiment, video and other content/data may be transmitted securely by content providers using open encryption technologies such as Secure Sockets Layer ("SSL") encryption or Transport Layer Security ("TLS") encryption. It should be noted, however, that various other point-to-point encryption technologies may be employed while still complying with the underlying principles of the invention.

Figure 3:
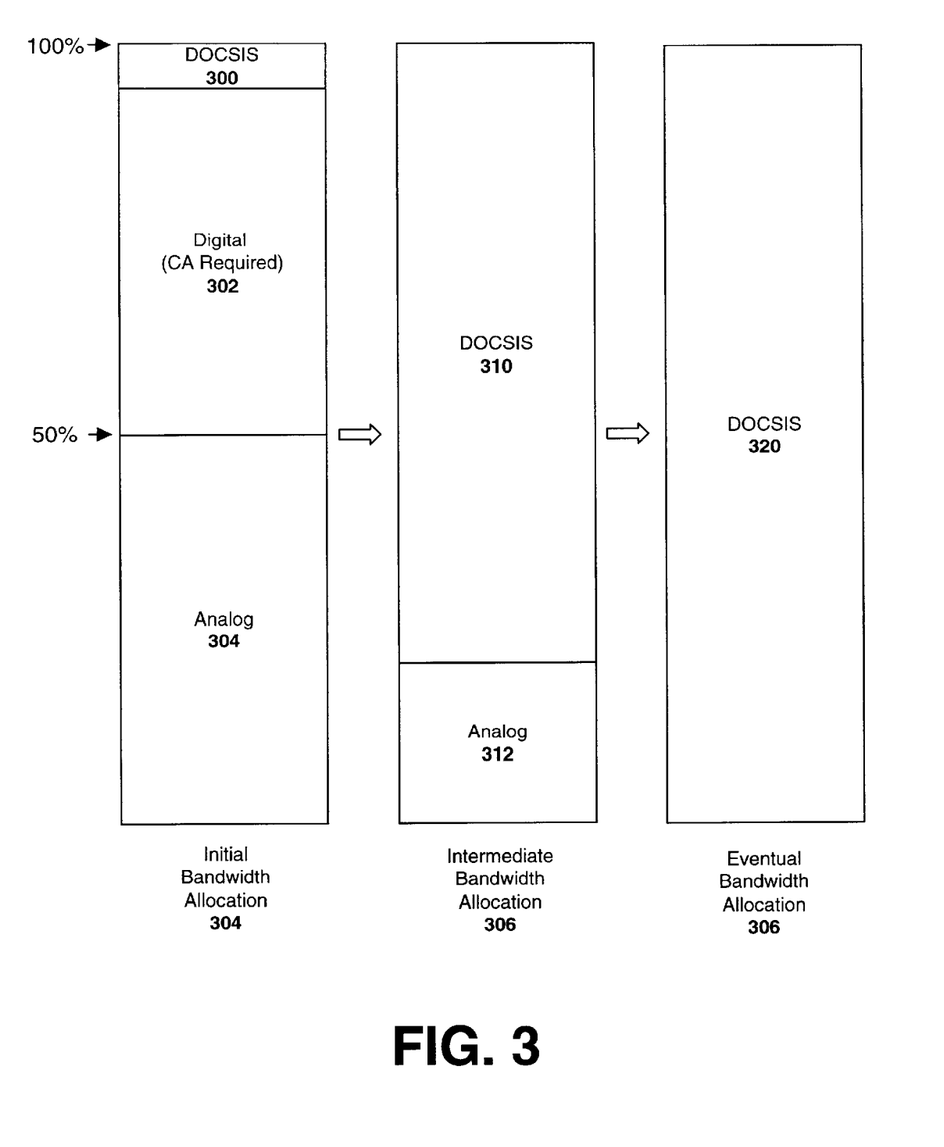
FIG. 3 illustrates multimedia and data bandwidth allocations which may be achieved using various embodiments of the invention.

In addition, because the embodiments described above are capable of receiving multimedia content transmitted from both standard channels (e.g., MPEG-2/QAM channels) and DOCSIS channels, the transition from current communication schemes to an all-DOCSIS communication scheme, illustrated in FIG. 3, may be accomplished seamlessly while, at the same, the overall quality of service to the end user will improve. For example, the current bandwidth allocation for data/content transmitted over cable provider networks is represented by bandwidth allocation 304, with approximately ½ of the available bandwidth being allocated to analog transmissions 304 and the majority of the remaining ½ being consumed by standard digital transmissions 302 (i.e., only a small fraction of the bandwidth 300 is currently used for DOCSIS transmissions, primarily to support cable Internet services).

Figure 2C:
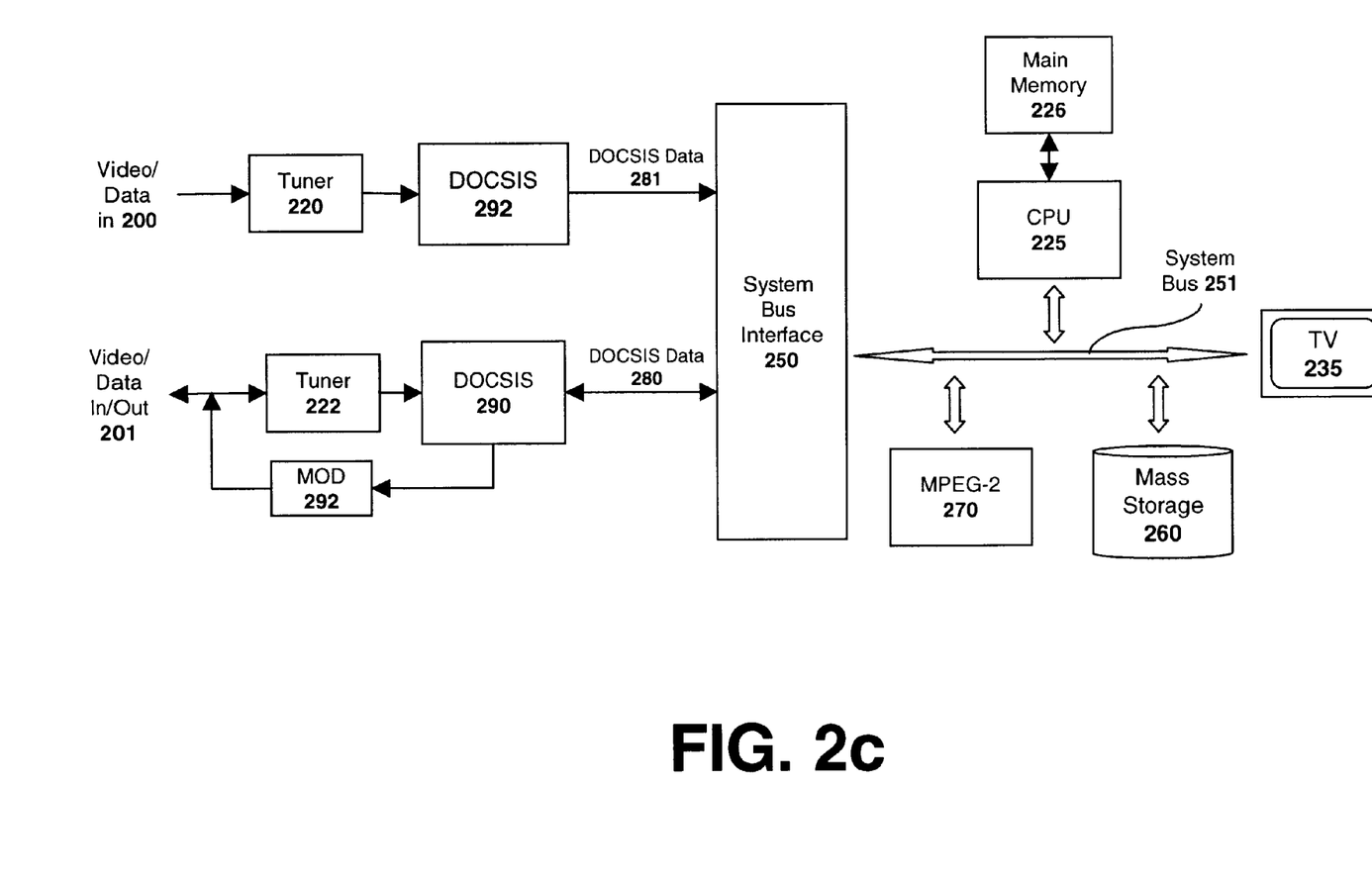
FIG. 2c illustrates a system for receiving and transmitting multimedia content and data according to another embodiment of the invention.

As indicated by the intermediate bandwidth allocation 306, however, cable operators may use embodiments of the invention described herein to seamlessly phase out the digital and analog multimedia transmissions, and to rely on DOCSIS (or some other packet-switched standard) for transmitting both data and multimedia content. Eventually, as represented by bandwidth allocation 306, cable operators may eventually switch to a DOCSIS-only transmission scheme. Moreover, once the transition to DOCSIS is complete, content providers can provide new users with the embodiment illustrated in FIG. 2c, comprised of dual DOCSIS modules 290, 292 for processing DOCSIS data/content transmissions and a modulator/transmitter 292 for providing upstream data/content transmissions. Typically only one modulator will be required; however, in one embodiment a second upstream modulator (not shown) may be associated with DOCSIS module 292 and tuner 220.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

Elements of the present invention may also be provided as a computer program product which may include a machine-readable medium having stored thereon instructions which may be used to program a computer (or other electronic device) to perform a process. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, the present invention may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

Throughout this detailed description, for the purposes of explanation, numerous specific details were set forth in order to provide a thorough understanding of the present invention. It will be apparent, however, to one skilled in the art that the system and method may be practiced without some of these specific details. For example, while the embodiments described above focus on the DOCSIS standard, the underlying principles of the invention may be implemented using various other packet-based protocols (e.g., TCP/IP). Similarly, various compression algorithms other than MPEG-2 may be employed while still complying with the underlying principles of the invention (e.g., MPEG-4, RealVideo® 8). In other instances, well known structures and functions were not described in elaborate detail in order to avoid obscuring the subject matter of the present invention. Accordingly, the scope and spirit of the invention should be judged in terms of the claims which follow.

What is claimed is:

1. A multimedia apparatus comprising:
    a tuner for tuning to a carrier frequency and down-converting a frequency-modulated multimedia signal to a baseband multimedia signal;
    a selectable protocol module including QAM/MPEG logic and Data Over Cable Service Interface Specification ("DOCSIS") logic each configured to share said tuner to receive said baseband multimedia signal; and
    selection logic configured to select said QAM/MPEG logic for processing a first signal having a first signal format to produce a first processed signal, said selection logic further configured to select said DOCSIS logic for processing a second signal having a second signal format to produce a second processed signal wherein said selection logic is further configured to cause said second processed signal to bypass a conditional access ("CA") subsystem communicatively coupled to said selectable protocol module.

2. The multimedia apparatus as in claim 1 wherein said CA subsystem is configured to receive said first processed signal and to determine if a user should be permitted to receive said first processed signal.

3. The multimedia apparatus as in claim 2, further comprising:
    a second tuner for tuning to a carrier frequency and down-converting a second frequency-modulated multimedia signal to a second baseband multimedia signal;
    a QAM module for demodulating said second baseband signal; and
    a second CA subsystem for demodulating said second baseband signal.

4. The multimedia apparatus as in claim 2, further comprising:
    a second tuner for tuning to a carrier frequency and down-converting a second frequency-modulated multimedia signal to a second baseband multimedia signal; and a QAM module for demodulating said second baseband signal, wherein a second CA subsystem demodulates said second baseband signal.

5. The multimedia apparatus as in claim 3 wherein said first signal is a multimedia signal transmitted from a cable provider.

6. The multimedia apparatus as in claim 3 wherein said second signal is a data signal transmitted from a server on the Internet.

7. The multimedia apparatus as in claim 1 wherein said DOCSIS logic is further configured to transmit data over a network using a modulator/transmitter unit.

8. The multimedia apparatus as in claim 7 wherein said data signal includes a Web page.

9. A multimedia communication system comprising:

a communication channel configured to switch between a first mode in which said communication channel receives from a tuner and decodes a first multimedia signal using MPEG logic, and a second mode in which said communication channel receives from the same turner and transmits data and/or multimedia content according to the Data Over Cable Service Interface Specification ("DOCSIS") standard wherein a selection logic configured to select MPEG logic for producing a first processed signal and configured to select said DOCSIS logic for producing a second processed signal, and wherein said selection logic is further configured to cause said second processed signal to bypass a conditional access ("CA") module communicatively coupled to said switch communication channel.

10. The multimedia communication system as in claim 9 wherein said MPEG logic is MPEG-2 decode logic.

11. The multimedia communication system as in claim 9 further comprising:

a second communication channel configured to switch between a first mode in which said second communication channel receives and decodes a first multimedia signal using MPEG logic, and a second mode in which said second communication channel transmits and receives data and/or multimedia content according to the DOCSIS standard.

12. The multimedia communication system as in claim 11 wherein comprising:

said CA module module shared between said first communication channel and said second communication channel.

13. The multimedia communication system as in claim 9 further comprising:

a mass storage device for storing said data and/or said multimedia content.

14. The multimedia communication system as in claim 9 further comprising:

selection logic configured to select between said first mode and said second mode.

15. The multimedia communication system as in claim 14 wherein said selection logic is software executed by a central processing unit.

16. A method implemented by a multimedia service provider for transitioning to a Data Over Cable Service Interface Specification ("DOCSIS") communication standard comprising:

providing subscribers with a first type of multimedia system having one or more selectable protocol modules, said selectable protocol modules each receiving baseband multimedia signals from a single tuner and being capable of selecting between a legacy communication standard and a DOCSIS communication standard for transmitting/receiving data and/or multimedia content; and switching from said legacy communication standard to a DOCSIS-only communication standard to transmit/receive multimedia content and/or data; and providing new subscribers with a second type of multimedia system having one or more DOCSIS modules capable of transmitting/receiving data and/or multimedia content according to the DOCSIS standard wherein multimedia content and/or data is transmitted to end users using a secure point-to-point transmission standard rather than using a conditional access ("CA") module.

17. The method as in claim 16 wherein said secure point-to-point transmission standard is Secure Sockets Layer ("SSL") encryption.

18. The method as in claim 16 wherein said legacy communication standard is quadrature amplitude modulation ("QAM") and MPEG-2 compression.

* * * * *